US012260665B2

(12) United States Patent
Jeon

(10) Patent No.: US 12,260,665 B2
(45) Date of Patent: Mar. 25, 2025

(54) APPARATUS AND METHOD FOR DETECTING ANIMAL OBJECT BASED ON IMAGE

(71) Applicant: INTFLOW INC., Gwangju (KR)

(72) Inventor: Kwang Myung Jeon, Gwangju (KR)

(73) Assignee: INTFLOW INC., Gwangju (KR)

( * ) Notice: Subject to any disclaimer, the term of this patent is extended or adjusted under 35 U.S.C. 154(b) by 302 days.

(21) Appl. No.: 17/702,394

(22) Filed: Mar. 23, 2022

(65) Prior Publication Data

US 2022/0398861 A1 Dec. 15, 2022

(30) Foreign Application Priority Data

Jun. 9, 2021 (KR) .................. 10-2021-0074545

(51) Int. Cl.
*G06V 40/10* (2022.01)
*G06T 7/73* (2017.01)
(Continued)

(52) U.S. Cl.
CPC ............... *G06V 40/10* (2022.01); *G06T 7/73* (2017.01); *G06V 10/46* (2022.01); *G06V 10/764* (2022.01);
(Continued)

(58) Field of Classification Search
CPC ...... G06V 40/10; G06V 10/46; G06V 10/764; G06V 10/774; G06V 10/82; G06V 40/103; G06V 10/40; G06T 7/73; G06T 2207/20081; G06T 2207/20084; G06T 2207/30232; G06T 2210/12; G06N 3/04; G06N 20/00
See application file for complete search history.

(56) References Cited

U.S. PATENT DOCUMENTS

2019/0132510 A1* 5/2019 Beach .................. G06F 9/542
2020/0410669 A1* 12/2020 Psota ................... G06T 7/0012
2021/0153479 A1* 5/2021 Mindel ................ G06V 10/22

FOREIGN PATENT DOCUMENTS

JP 2016157258 9/2016
KR 102019301 9/2019

OTHER PUBLICATIONS

Bochkovskiy, et al., YOLOv4: Optimal Speed and Accuracy of Object Detection, Computer Vision and Pattern Recognition, 2020, pp. 1-17.

* cited by examiner

*Primary Examiner* — Akwasi M Sarpong
*Assistant Examiner* — Michael L Burleson
(74) *Attorney, Agent, or Firm* — CANTOR COLBURN LLP

(57) ABSTRACT

An image-based animal object detection apparatus includes: a communication module; a memory that stores therein a program configured to extract animal detection information; and a processor that executes the program. Herein, the program configured to extract animal detection information extracts the animal detection information by inputting received image into an animal detection model that is trained based on learning data composed of animal images. The animal detection information includes, as information about a bounding box created to be suitable for an animal object detected from the image, coordinates of a central point, a width and a length of the bounding box and a rotational angle of the bounding box, and includes, a position information indicating keypoints of the animal object.

12 Claims, 8 Drawing Sheets

(51) Int. Cl.
   *G06V 10/46* (2022.01)
   *G06V 10/764* (2022.01)
   *G06V 10/774* (2022.01)
   *G06V 10/82* (2022.01)
(52) U.S. Cl.
   CPC ............ *G06V 10/774* (2022.01); *G06V 10/82* (2022.01); *G06T 2207/20081* (2013.01); *G06T 2207/20084* (2013.01)

| ATTRIBUTE | FORM | VARIABLE | RANGE |
|---|---|---|---|
| rbbox | {xc, yc, w, h, theta} | $R$ | xc, yc, w, h = [COORDINATE RANGE]<br>theta = [-pi/2~pi/2] |
| keypoint | {(x1,y1), (x2,y2), ... (xn,yn)} | $K$ | COORDINATE RANGE |
| class | c | $c$ | CLASS INDEX, INTEGER OF 0 OR MORE |
| pose | p | $p$ | CLASS INDEX, INTEGER OF 0 OR MORE |

APPARATUS AND METHOD FOR DETECTING ANIMAL OBJECT BASED ON IMAGE

TECHNICAL FIELD

The present disclosure relates to an apparatus and method for detecting an animal object based on an image.

BACKGROUND

With recent advances in image processing and various IT technologies, a system capable of automatically monitoring the condition of an animal in a shed or the like is being actively developed. In particular, a technique of automatically recognizing each animal object and automatically classifying the behavior of the animal object by using CCTV images is being developed.

However, it is difficult to accurately detect a plurality of dynamically moving animals by such an image processing technique alone.

According to a conventional technology known as a universal object detection technology, detection information about an object of interest is represented by an axis-aligned bounding box. Such a bounding box can usually be used to detect an animal object in most cases. However, if the object is d with an axis, a broad background area, which does not actually correspond to the object, can be overestimated as an object area.

FIG. 1 shows an example where a conventional object detection method is applied.

According to the conventional technology, how much the orientation of an object in an image is aligned with a horizontal axis or a vertical axis affects accuracy in object detection. As shown in FIG. 1, it can be seen that when an object is aligned diagonally, a bounding box larger than the actual object can be created. In particular, if a plurality of animals of the same class is crowded and overlaps each other, a detection area for each animal may be overestimated, which may result in a great decrease in detection accuracy for each of the crowded animals.

To solve this problem, the present disclosure proposes a new object detection method specialized for animal detection.

SUMMARY

In view of the foregoing, the present disclosure is conceived to provide an apparatus and method for detecting an animal object based on an image by which a bounding box trained to be suitable for the animal object is created, and, thus, the animal object can be detected.

However, the problems to be solved by the present disclosure are not limited to the above-described problems. There may be other problems to be solved by the present disclosure.

A first aspect of the present disclosure provides an image-based animal object detection apparatus including: a communication module that receives an image of a target object; a memory that stores therein a program configured to extract animal detection information from the received image; and a processor that executes the program. Herein, the program configured to extract animal detection information extracts the animal detection information by inputting the received image into an animal detection model that is trained based on learning data composed of animal images. The animal detection information includes, as information about a bounding box created to be suitable for an animal object detected from the image, coordinates of a central point of the bounding box, a width of the bounding box, a length of the bounding box and a rotational angle of the bounding box with respect to a reference axis, and includes, as position information indicating keypoints of the animal object, a position of the end of the head of the animal object, a position of the neck and a position of the end of the body.

A second aspect of the present disclosure provides a method for detecting an animal object by using an image-based animal object detection apparatus, including: a process of receiving an image of a target object; and a process of extracting animal detection information by inputting the received image into an animal detection model that is trained based on learning data composed of animal images. Herein, the animal detection information includes, as information about a bounding box created to be suitable for an animal object detected from the image, coordinates of a central point of the bounding box, a width of the bounding box, a length of the bounding box and a rotational angle of the bounding box with respect to a reference axis, and includes, as position information indicating keypoints of the animal object, a position of the end of the head of the animal object, a position of the neck and a position of the end of the body.

According to an embodiment of the present disclosure, unlike the conventional object detection technology, a bounding box can be created in consideration of a rotational direction of an animal object, and, thus, it is possible to greatly improve the detection accuracy for crowded livestock.

According to an embodiment of the present disclosure, unlike the conventional object detection technology, the head, neck and hip of a detected object can be distinguished by showing landmarks for respective body parts of a livestock animal. Therefore, it is possible to implement various applications for monitoring an animal object.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
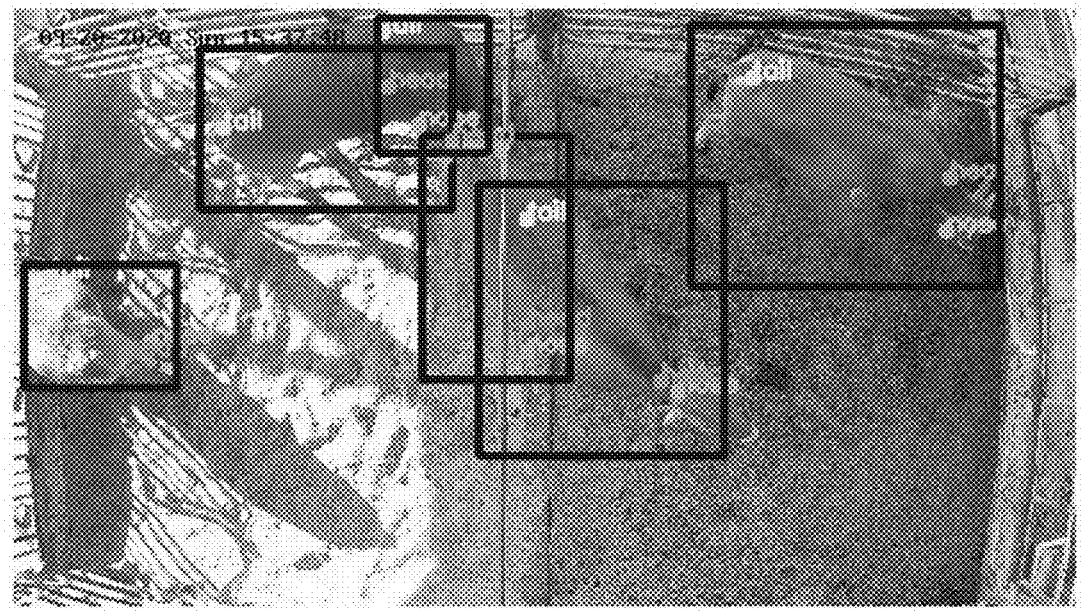
FIG. 1 shows an example where a conventional object detection method is applied.

Hereafter, embodiments of the present disclosure will be described in detail with reference to the accompanying drawings. However, it is to be noted that the present disclosure is not limited to the embodiments but can be embodied in various other ways. Also, the accompanying drawings are provided to help easily understand the embodiments of the present disclosure and the technical conception described in the present disclosure is not limited by the accompanying drawings. In the drawings, parts irrelevant to the description are omitted for the simplicity of explanation, and the size, form and shape of each component illustrated in the drawings can be modified in various ways. Like reference numerals denote like parts through the whole document.

Suffixes "module" and "unit" used for components disclosed in the following description are merely intended for easy description of the specification, and the suffixes themselves do not give any special meaning or function. Further, in the following description of the present disclosure, a detailed explanation of known related technologies may be omitted to avoid unnecessarily obscuring the subject matter of the present disclosure.

Throughout this document, the term "connected to (contacted with or coupled to)" may be used to designate a connection or coupling of one element to another element and includes both an element being "directly connected to (contacted with or coupled to)" another element and an element being "electronically connected to (contacted with or coupled to)" another element via another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Further, in describing components of the present disclosure, ordinal numbers such as first, second, etc. can be used only to differentiate the components from each other, but do not limit the sequence or relationship of the components. For example, a first component of the present disclosure may also be referred to as a second component and vice versa.

Figure 2:
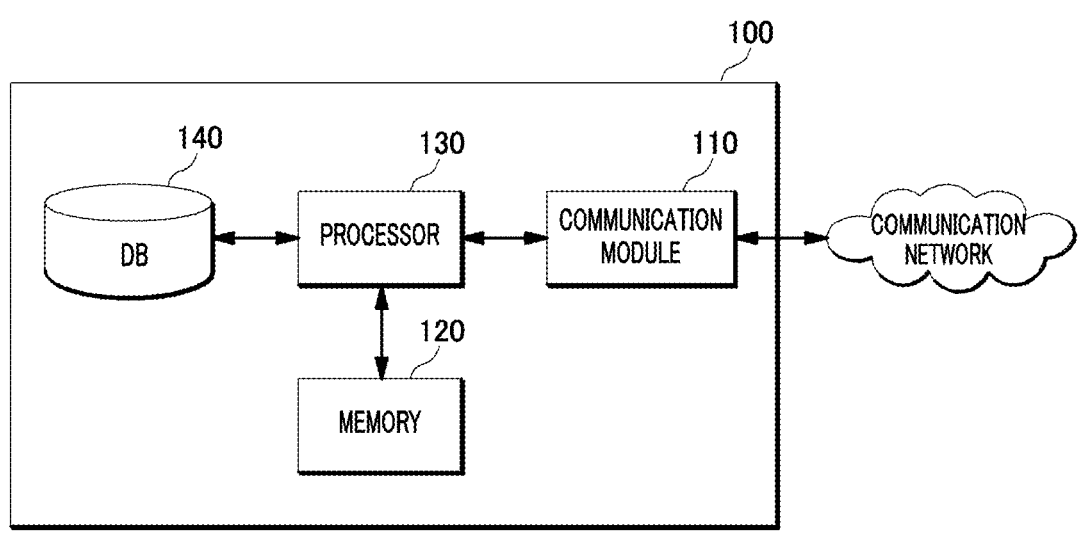
FIG. 2 is a block diagram illustrating a configuration of an image-based animal object detection apparatus according to an embodiment of the present disclosure.

FIG. 2 is a block diagram illustrating a configuration of an image-based animal object detection apparatus according to an embodiment of the present disclosure.

Referring to FIG. 2, an image-based animal object detection apparatus 100 includes a communication module 110, a memory 120 and a processor 130. The image-based animal object detection apparatus 100 may also include a database 140. The image-based animal object detection apparatus 100 receives images from a plurality of CCTVs installed at a shed in real time and detects an animal object by using the received images.

To this end, the image-based animal object detection apparatus 100 may be implemented with a computer or portable device which can access a server or another device through a network. Herein, the computer may include, for example, a notebook, a desktop and a laptop equipped with a WEB browser. The portable devices may be, for example, a wireless communication device that ensures portability and mobility and may include all kinds of handheld-based wireless communication devices such as various smart phones, tablet PCs, smart watches, and the like.

The term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

The communication module 110 receives images of a target object from one or more cameras. Herein, the target object may include various classes of animal objects such as cows, pigs and dogs. The communication module 110 may include hardware and software required to transmit and receive a signal, such as a control signal or a data signal, through wired/wireless connection with other network devices.

The memory 120 stores therein a program configured to extract animal detection information from the images received through the communication module 110. Herein, the program configured to extract animal detection information extracts the animal detection information by inputting the received images into an animal detection model that is trained based on learning data composed of animal images. Details of the animal detection information will be described later.

Herein, the memory 120 may collectively refer to a non-volatile storage device that retains information stored therein even when power is not supplied and a volatile storage device that requires power to retain information stored therein. The memory 120 may function to temporarily or permanently store data processed by the processor 130. The memory 120 may include magnetic storage media or flash storage media in addition to the volatile storage device that requires power to retain information stored therein, but the present disclosure is not limited thereto.

The processor 130 executes the program configured to extract the animal detection information stored in the memory 120 and outputs the animal detection information about the target object as a result of execution.

In an example, the processor 130 may be implemented as a microprocessor, a central processing unit (CPU), a processor core, a multiprocessor, an application-specific integrated circuit (ASIC) or a field programmable gate array (FPGA), but the scope of the present disclosure is not limited thereto.

The database 140 may store therein images taken with the cameras and received through the communication module 110 or various data for training of the animal detection model. In particular, different cameras may be installed at different locations of each shed, and images taken with the respective cameras installed at each shed may be distinguished and separately stored in the database 140. Also, the database 140 accumulatively stores the animal detection information extracted by the animal detection information extraction program, and the animal detection information can be used in various applications for monitoring the condition of an animal.

Figures 3, 4:
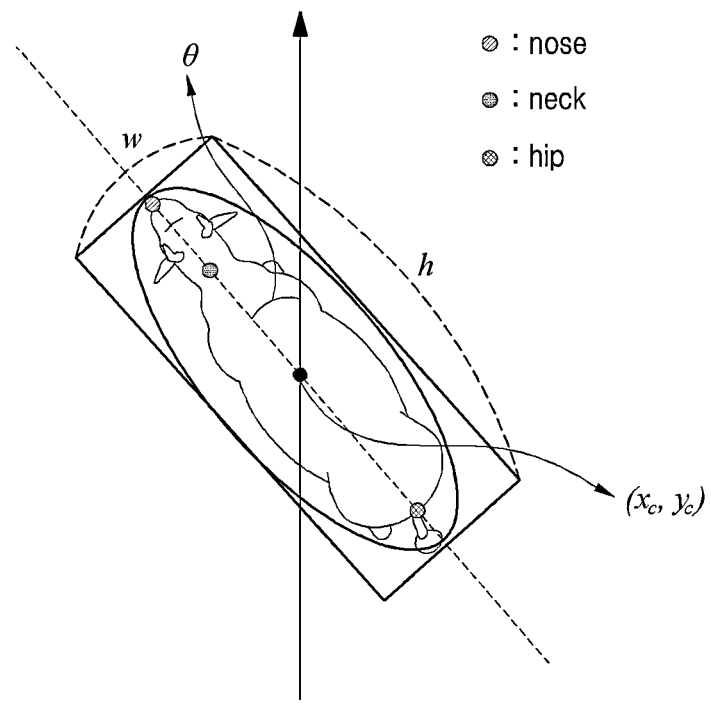
FIG. 3 and FIG. 4 are provided to explain animal detection information extracted by the image-based animal object detection apparatus according to an embodiment of the present disclosure.

FIG. 3 and FIG. 4 are provided to explain animal detection information extracted by the image-based animal object detection apparatus according to an embodiment of the present disclosure.

The animal detection information includes, as information about a bounding box (rbbox) created to be suitable for an animal object detected from an image, coordinates (xc, yc) of a central point of the bounding box, a width (w) of the bounding box, a length (h) of the bounding box and a rotational angle (theta) of the bounding box with respect to a reference axis.

Also, the animal detection information includes, as position information indicating keypoints of the animal object, a position (x1, y1) of the end of the head of the animal object, a position (x2, y2) of the neck and a position (xn, yn) of the end of the body.

The animal detection information may further include information about the class of the animal object detected from the image and information about a pose of the animal object. The information about the class of the animal object may distinguish different species of animals and different growth stages of the same species. For example, pigs can be classified into suckling pigs, weaning pigs, growing pigs, fed pigs, candidate pigs, pregnant pigs and farrowing pigs. Also, the information about a pose of the animal object may distinguish various poses such as sitting, standing, mounting behavior, rollover, and dog sitting.

Examples of the animal detection information can be seen more clearly from FIG. 4. As described above, the bounding box of the present disclosure is created in consideration of the degree of rotation of the axis of the animal object as a detection target, and, thus, the bounding box can be optimized for the size of the animal object.

Figure 5A:
FIGS. 5A and FIG. 5B are provided to explain a difference between a bounding box of a conventional technology and a bounding box of the present disclosure.
Figure 5B:
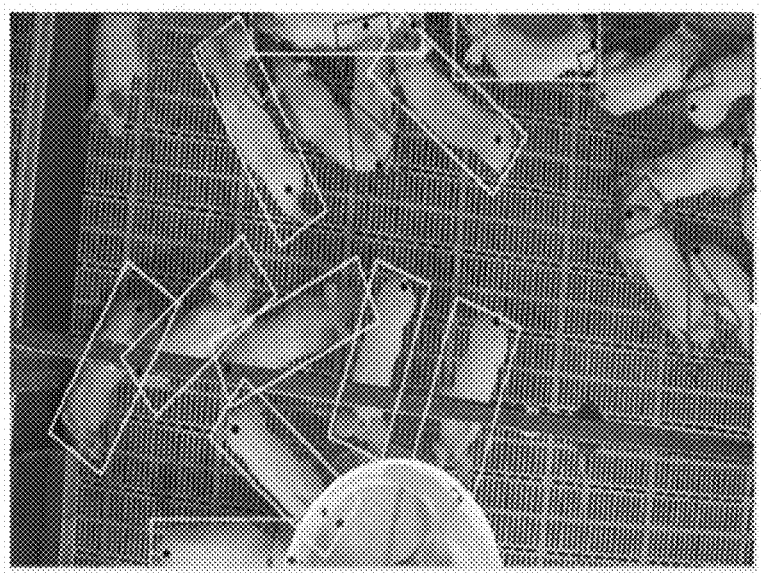

FIG. 5A and FIG. 5B are provided to explain a difference between a bounding box of a conventional technology and a bounding box of the present disclosure.

As shown in FIG. 5A and FIG. 5B, it can be seen that according to the conventional technology (FIG. 5A), a bounding box is created in a state where it is not aligned with the axis of each object, whereas according to the present disclosure (FIG. 5B), a bounding box is created in consideration of the degree of rotation of the axis of each object, and, thus, the areas for the objects are generally uniform in size.

Hereafter, an animal detection model that creates such animal detection information will be described.

Figure 6:
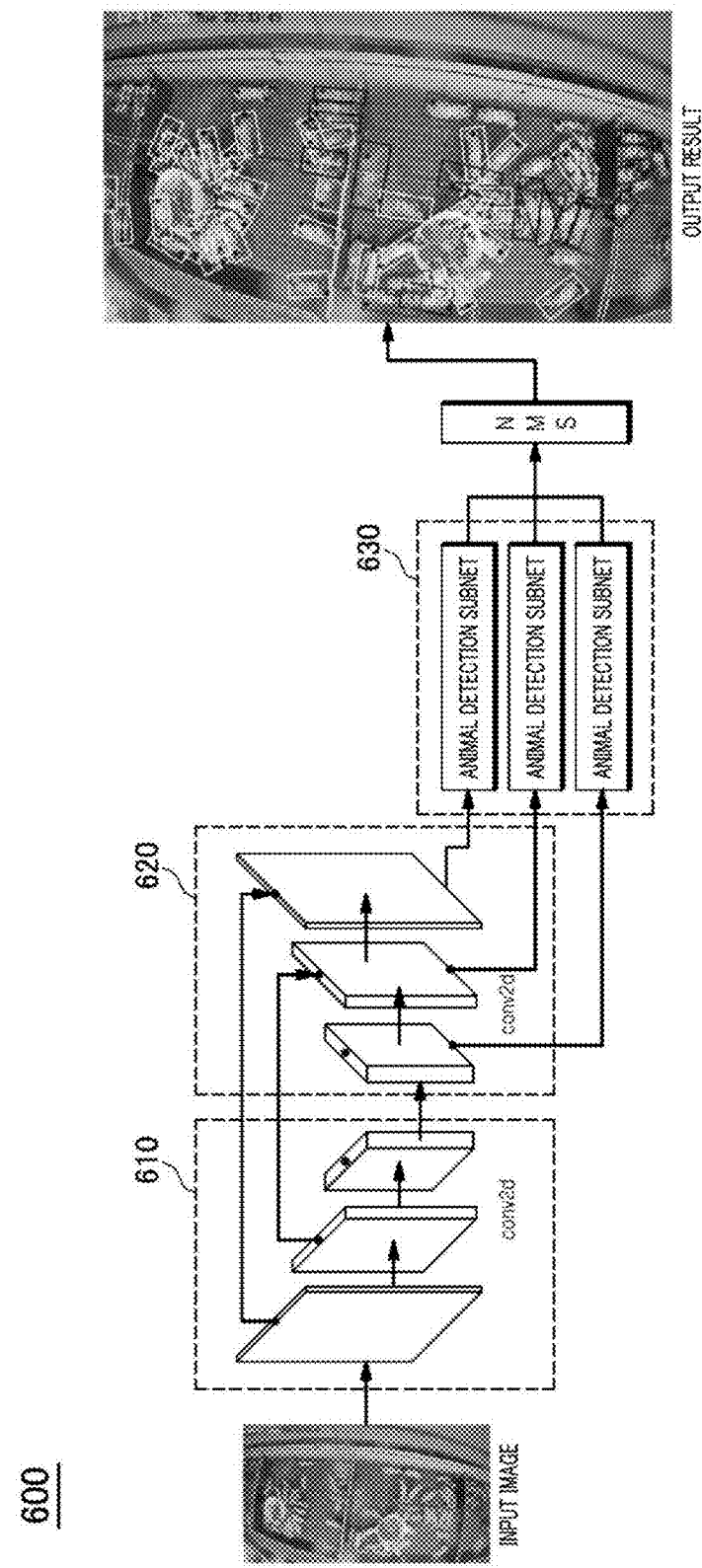
FIG. 6 through FIG. 8 are provided to explain an animal detection model of the image-based animal object detection apparatus according to an embodiment of the present disclosure.
Figure 7:
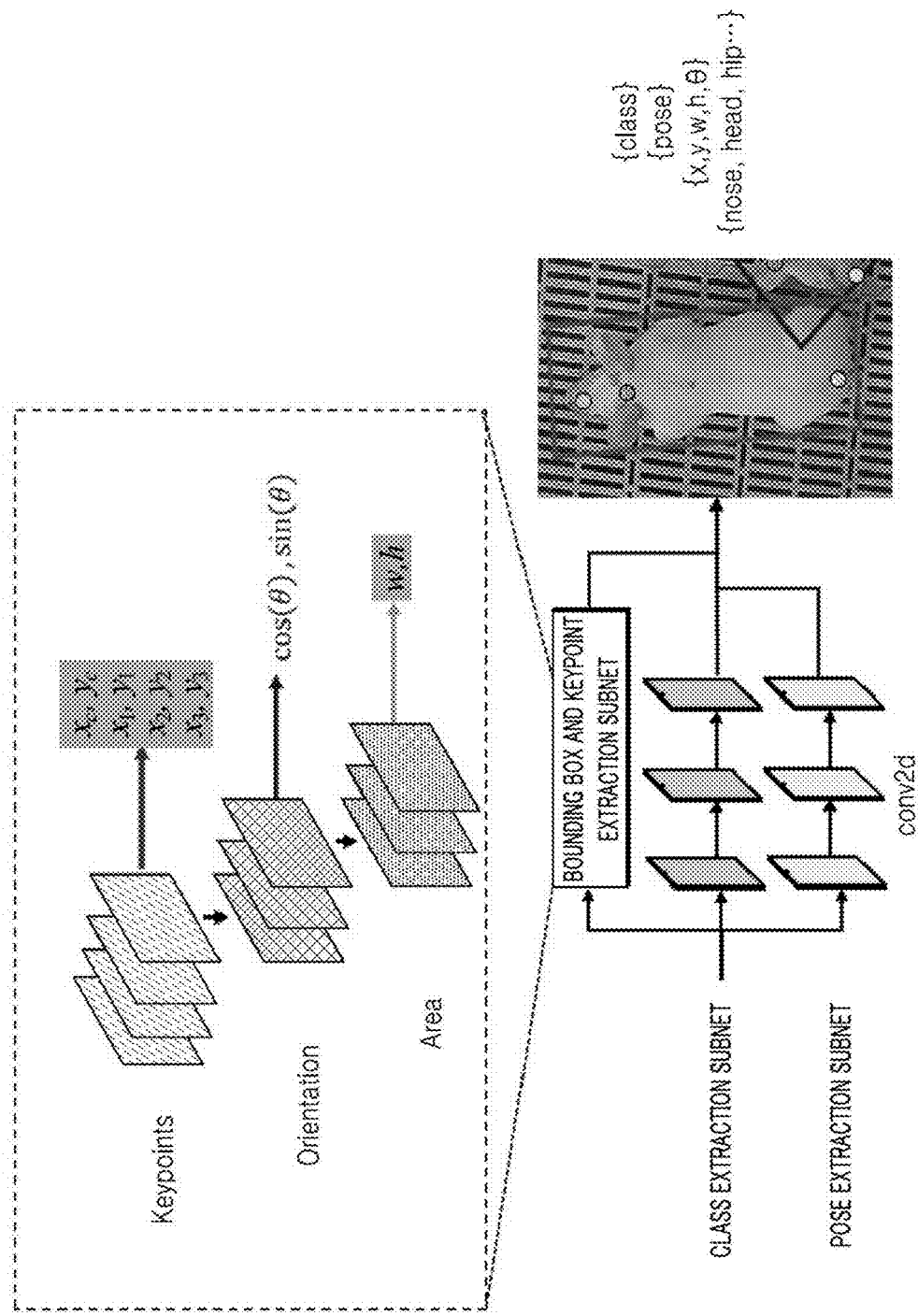
Figure 8:
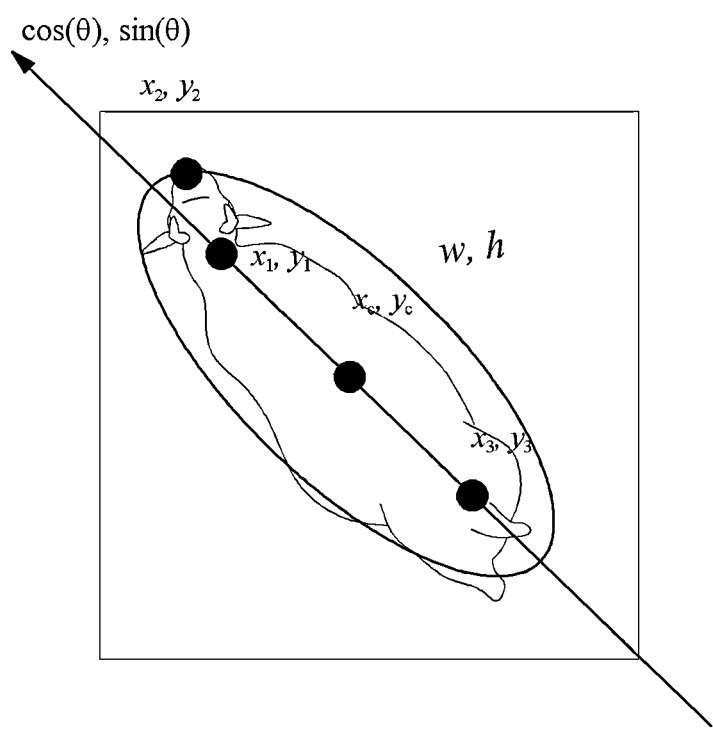

FIG. 6 through FIG. 8 are provided to explain an animal detection model of the image-based animal object detection apparatus according to an embodiment of the present disclosure.

An animal detection model 600 used in the present disclosure is constructed based on learning data in which a plurality of images including at least one animal object is matched with animal detection information about animal objects included in each image. The animal detection model 600 is trained through a training process and then automatically outputs animal detection information in response to an actually input image through an inference process on the input image.

The animal detection model 600 includes a backbone 610, a neck 620 and a head 630.

The backbone 610 is a component configured to extract a feature from the input image and commonly used for deep neural network-based image analysis and processing. The backbone 610 is mainly configured as a stack of 2D convolution layers as illustrated in FIG. 6, and has been improved to have various neural network structures in order to improve the efficiency thereof. Backbones of various structures commonly function to receive an image and extract intermediate information. The intermediate information is delivered to the neck 620.

The neck 620 collects the intermediate information from each layer of the backbone 610 based on the feature extracted by the backbone 610. The neck 620 is a lower neural network forming a universal object detector and functions to collect the intermediate information from each layer of the backbone 610 and analyze the intermediate information. The image analyzed in each layer has different resolutions. Thus, if a target object is a long or short distance away, the neck 620 extracts intermediate information from each layer to effectively detect animals of various sizes and provides the intermediate information to the head 630. The neck 620 may have various configurations depending on the form of the backbone 610. Specifically, the number of layers of a neural network forming the neck 620 and a hyperparameter for each layer may vary depending on the form of the backbone 610.

The head 630 outputs animal detection information based on the intermediate information collected by the neck 620. The head 630 receives the intermediate information acquired by the neck 620 and outputs animal detection information. The head 630 receives the intermediate information from each layer of the neck 620 and outputs the animal detection information recognized by each layer. In particular, the head 630 of the present disclosure includes a plurality of animal detection subnets, and each animal detection subnet includes a subnet for extracting a bounding box and a keypoint, a subnet for extracting a class of an animal and a subnet for extracting a pose of an animal as shown in FIG. 7.

Meanwhile, a non-maximum suppression (NMS) module may be further coupled to an output end of the head 630. The NMS refers to an algorithm for selecting a bounding box with the highest similarity when several bounding boxes are created for the same object. Since it is a conventional technology, a detailed description thereof will be omitted.

The subnet for extracting a bounding box and a keypoint is composed of cascaded multi-lane deep convolutional networks. The cascaded multi-lane deep convolutional networks are constructed according to a causal order for extracting a bounding box and a keypoint for a given animal image. A piece of animal detection information is defined from each image according to the following causal order.

That is, as shown in FIG. 8, a central point (xc, yc) and major points ((x1, y1), (x2, y2), (x3, y3)) are marked first. Then, a tangent line passing through the central point and one or more of the major points is drawn. Finally, an area (plane) with the tangent line passing through its center is defined.

In the cascaded multi-lane deep convolutional networks constructed as described above, information is delivered according to the causal order and each information is output. That is, a first lane outputs the central point and the keypoint, a second lane outputs a direction (theta) of the tangent line, and a third lane outputs a width and a height of the area including the tangent line and the central point.

Meanwhile, each of the subnet for extracting a class of an animal and the subnet for extracting a pose of an animal is obtained through a general structure, i.e., a single-lane deep convolutional network.

The animal detection model can also be represented by the following equations.

$$E(A)=M(I)$$

$$M(x)=H(N(B(x)))$$

Herein, A={R.K, c, p} refers to vectorized animal detection information, M(x) refers to an animal detection model, I refers to an input image matrix (with a dimension of image width×image height×image channel), and E(A) refers to encoded animal detection information. Also, B(x), N(x) and H(x) represent the backbone 610, the neck 620 and the head 630, respectively.

The output in response to the input of the input image matrix into the animal detection model M(x) is trained to be identical to the encoded animal detection information E(A), and the animal detection model is constructed through a process of repeatedly updating the weight of the animal detection model by backpropagation learning.

The learning data used in the training process of the animal detection model include a plurality of images and animal detection information matched with each image. Herein, the animal detection information is manually extracted from each image. That is, when an operator sees each image, the operator may use an appropriate SW tool to directly input animal detection information, or animal detection information may be automatically input by an already developed animal detector and then corrected or supplemented by the operator. For example, the operator displays a bounding box in consideration of a rotational direction of an animal object with respect to a reference axis for each animal object included in an image and creates coordinates of a central point of each bounding box, a width of the bounding box, a length of the bounding box and a rotational angle of the bounding box with respect to a reference axis. Also, the operator extracts information about the class or pose of the animal object and uses the information as learning data.

The animal detection information included in the learning data is encoded before being used in the training process.

Herein, the animal detection information may be encoded through the following process.

First, an area of interest ($\hat{R}_a$) is defined for each head 630. Herein, the number of areas of interest ($\hat{R}_a$) is defined by processing area for each head 630×type of size×type of angle×box ratio.

Also, the degree of overlap ($O_{a,k}$) between an animal area and an area of interest included in the animal detection information (A) is calculated by the following equation.

$$O_{a,k} = I_oU(\hat{R}_a, R_k)$$

Herein, the degree of overlap IoU(x, y) between two bounding boxes is calculated.

Then, only an animal area ($R_k$) with the highest degree of overlap with each area of interest is selected. Herein, k'=argmax$_k$($O_{a,k}$).

Thereafter, the area of interest and the animal area corresponding thereto area encoded.

$$E(A) = \forall_a[e_R(R_{k'}, \hat{R}_a), e_K(K_{k'}, \hat{R}_a), c_a, p_a]$$

Herein, $e_R(R, \hat{R})$ is processed as follows.
When R=[$x_c$, $y_c$, w, h, θ] and $\hat{R}$=[$\hat{x}_c$, $\hat{y}_c$, $\hat{w}$, $\hat{h}$, $\hat{\theta}$], $e_R(R, \hat{R})$ is processed as $$\bar{x}_c = (x_c - \hat{x}_c)/\hat{w}$$

$$\bar{y}_c = (y_c - \hat{y}_c)/\hat{h}$$

$$\bar{w} = \log(w/\hat{w})$$

$$\bar{h} = \log(h/\hat{h}).$$

Accordingly, the output is as follows.

$$\bar{R} = [\bar{x}_c, \bar{y}_c, \bar{w}, \bar{h}, \sin(\theta), \cos(\theta)] = e_R(R, \hat{R})$$

Likewise, $e_K(K, \hat{R})$ is processed as follows.
When K=$x_1$, $y_1$, $x_2$, $y_2$ ... ] and R=[$\hat{x}_c$, $\hat{y}_c$, $\hat{w}$, $\hat{h}$, $\hat{\theta}$], $e_K(K, \hat{R})$ is processed as $$\bar{x}_1 = (x_1 - \hat{x}_c)/\hat{w}$$

$$\bar{y}_1 = (y_1 - \hat{x}_c)/\hat{h}$$

$$\bar{x}_2 = (x_2 - \hat{x}_c)/\hat{w}$$

$$\bar{y}_2 = (y_2 - \hat{y}_c)/\hat{h}$$

. . . .

Accordingly, the output is as follows.

$$\bar{K} = [\bar{x}_1, \bar{y}_1, \bar{x}_2, \bar{y}_2 \ldots ] = e_K(K, \hat{R})$$

The detection information encoded through the above-described process is used for constructing the animal detection model.

Meanwhile, the animal detection model is trained, backpropagation learning may be used. That is, a loss value between the encoded animal detection information and its estimate is calculated and a neural network parameter forming the animal detection model is updated repeatedly to reduce the loss value. For example, when a loss value between the bounding box (rbbox) and the keypoints of the animal object is calculated, a loss L1 or L2 may be used, and when a loss value for the class (c) of the animal object or the pose (p) of the animal object is calculated, a discrimination loss such as binary cross entropy loss or focal loss may be used.

The training is repeated by using the loss function until the sum of losses decreases below a target value to construct the animal detection model.

A process of inferring animal detection information (A) from the input image by using the animal detection model (M(x)) constructed as described above will be described. This can be represented by the following equation.

$$E(A) = M(I)$$

That is, when the input image is input into the animal detection model, the encoded detection information (E(A)) can be acquired. Then, the encoded detection information is decoded.

When E(A)=$\forall_a$[$\bar{R}_a$, $\bar{K}_a$, $c_a$, $p_a$], only values for $c_a$ higher than a threshold value are left. In other words, a'=a if $c_a$>thr. Herein, thr represents a detection threshold value.

Then, decoded animal detection area and keypoint information are acquired by processing $d_R(\bar{R}_{a'}, \hat{R}_{a'})$ and $d_K(\bar{K}_{a'}, \hat{R}_{a'})$, respectively. Herein, $d_R(\bar{R}_{a'}, \hat{R}_{a'})$ is processed as follows.

When $\bar{R}$=[$\bar{x}_c$, $\bar{y}_c$, $\bar{w}$, $\bar{h}$, sin(θ), cos(θ)] and $\hat{R}$=[$\hat{x}_c$, $\hat{y}_c$, $\hat{w}$, $\hat{h}$, $\hat{\theta}$], $d_R(\bar{R}_{a'}, \hat{R}_{a'})$ is processed as $$x_c = \bar{x}_c \hat{w} + \hat{x}_c$$

$$y_c = \bar{y}_c \hat{h} + \hat{y}_c$$

$$w = \exp(\bar{w})\hat{w}$$

$$h = \exp(\bar{w})\hat{h}$$

$$\theta = \mathrm{atan}(\sin(\theta)/\cos(\theta)).$$

Accordingly, the output is as follows.

$$R = [x_c, y_c, w, h, \theta] = d_R(\bar{R}_{a'}, \hat{R}_{a'})$$

Likewise, $d_K(\bar{K}_{a'}, \hat{R}_{a'})$ is processed as follows.
When K=[$\bar{x}_1$, $\bar{y}_1$, $\bar{x}_2$, $\bar{y}_2$, ... ] and $\hat{R}$=[$\hat{x}_c$, $\hat{y}_c$, $\hat{w}$, $\hat{h}$, $\hat{\theta}$], $d_K(\bar{K}_{a'}, \hat{R}_{a'})$ is processed as $$x_1 = \bar{x}_1 \hat{w} + \hat{x}_1$$

$$y_1 = \bar{y}_1 \hat{h} + \hat{y}_1$$

$$x_2 = \bar{x}_2 \hat{w} + \hat{x}_2$$

$$y_2 = \bar{y}_2 \hat{h} + \hat{y}_2$$

. . . .

Accordingly, the output is as follows.

$$K = [x_1, y_1, x_2, y_2, \ldots] = d_K(\overline{K}_a, \hat{R}_a)$$

The animal detection information (R, K, c, p) output through the above-described decoding process may include a number of pieces of overlapping information for a single animal object. To solve this problem, an algorithm for removing overlapping animal detection information may be applied.

To visually check the animal detection information, the animal detection information may be displayed as being overlaid on the image.

Figure 9:
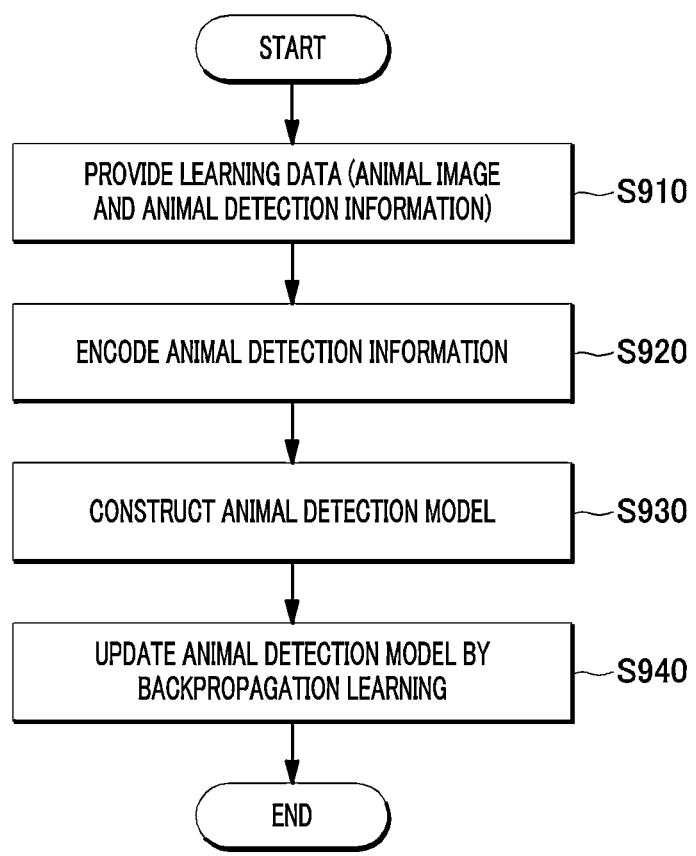
FIG. 9 is a flowchart illustrating a process of constructing an animal detection model according to an embodiment of the present disclosure.
Figure 10:
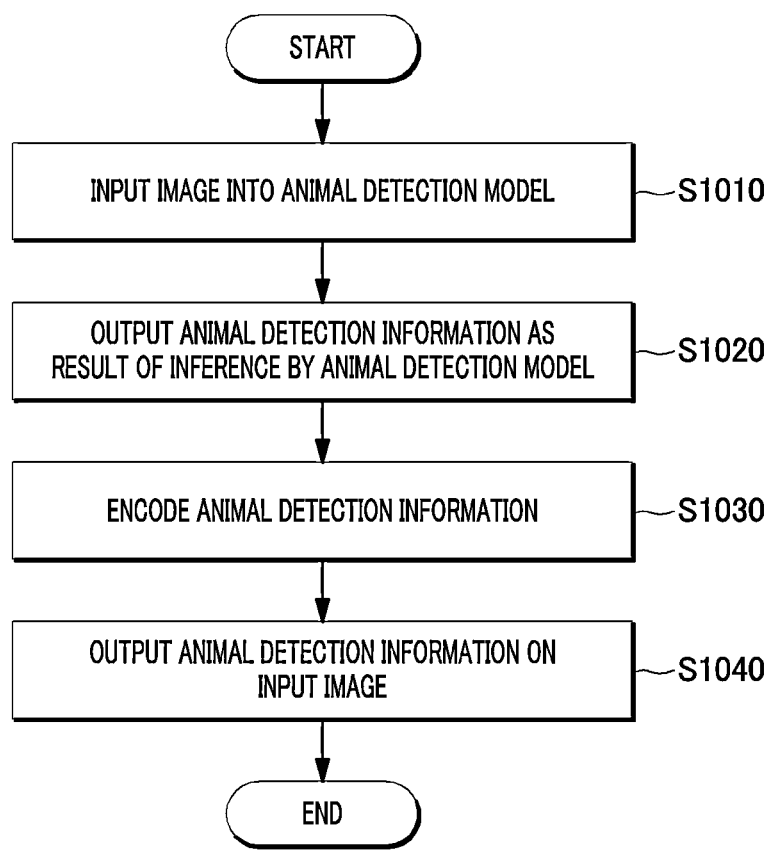
FIG. 10 is a flowchart illustrating an inference process using the animal detection model according to an embodiment of the present disclosure.

FIG. 9 is a flowchart illustrating a process of constructing an animal detection model according to an embodiment of the present disclosure, and FIG. 10 is a flowchart illustrating an inference process using the animal detection model according to an embodiment of the present disclosure.

Referring to FIG. 9, a plurality of animal images and animal detection information for each animal object included in each animal image are provided as learning data (S910).

Herein, the animal detection information is encoded through the above-described process (S920), and the encoded animal detection information is matched with each animal image and then input into the animal detection model.

The animal detection model is constructed based on the learning data input as described above (S930).

Herein, the animal detection model includes the backbone 610 configured to extract a feature from the input image, the neck 620 configured to collect intermediate information from each layer of the backbone 610 based on the feature extracted by the backbone 610, and the head 630 configured to output animal detection information based on the intermediate information collected by the neck 620.

Then, a process of updating the animal detection model by backpropagation learning is performed repeatedly (S940).

Thereafter, referring to FIG. 10, an input image that needs to be inferred is input into the animal detection model (S1010). The input image may be recorded in real time by a CCTV.

Then, animal detection information is output as a result of inference by the animal detection model (S1020).

Since the output animal detection information is encoded information, it is decoded (S1030). The decoding process is the same as described above.

The output animal detection information is displayed as being overlaid on the input image (S1040).

The animal object detection method described above can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

It would be understood by a person with ordinary skill in the art that various changes and modifications may be made based on the above description without changing technical conception and essential features of the present disclosure. Thus, it is clear that the above-described embodiments are illustrative in all aspects and do not limit the present disclosure. The scope of the present disclosure is defined by the following claims. It shall be understood that all modifications and embodiments conceived from the meaning and scope of the claims and their equivalents are included in the scope of the present disclosure.

EXPLANATION OF REFERENCE NUMERALS

100: Image-based animal object detection apparatus
110: Communication module
120: Memory
130: Processor
140: Database

I claim:

1. An image-based animal object detection apparatus, comprising:
a communication module that receives an image of a target object;
a memory that stores therein a program configured to extract animal detection information from the received image; and
a processor that executes the program,
wherein the program configured to extract animal detection information extracts the animal detection information by inputting the received image into an animal detection model that is trained based on learning data composed of animal images, and
the animal detection information includes, as information about a bounding box created to be suitable for an animal object detected from the image, coordinates of a central point of the bounding box, a width of the bounding box, a length of the bounding box and a rotational angle of the bounding box with respect to a reference axis, and includes, as position information indicating keypoints of the animal object, a position of the end of the head of the animal object, a position of the neck and a position of the end of the body, and
wherein the animal detection model is constructed based on learning data in which a plurality of images including at least one animal object is matched with the animal detection information about animal objects included in each image, and
the animal detection model includes a backbone configured to extract a feature from the input image, a neck configured to collect intermediate information from each layer of the backbone based on the feature extracted by the backbone, and a head configured to output the animal detection information based on the intermediate information collected by the neck.

2. The image-based animal object detection apparatus of claim 1,
wherein the program further extracts, as the animal detection information, information about the class of the animal object detected from the image and information about a pose of the animal object in the image.

3. The image-based animal object detection apparatus of claim 1, wherein the head of the animal detection model extracts a bounding box of the animal object and a keypoint of the animal object based on cascaded multi-lane deep convolutional networks, and the cascaded multi-lane deep convolutional networks are constructed to perform a process of extracting coordinates of a major keypoint, a process of extracting a direction of a tangent line passing through the coordinates of the major keypoint and a process of extracting a width and a height of an area including the tangent line and the major keypoint.

4. The image-based animal object detection apparatus of claim 1,
wherein the head of the animal detection model is constructed to extract each of information about the class of the animal object and information about a pose of the animal object based on a single-lane deep convolutional network.

5. An image-based animal object detection method for detecting an animal object by using an image-based animal object detection apparatus, comprising:
a process of receiving an image of a target object; and
a process of extracting animal detection information by inputting the received image into an animal detection model that is trained based on learning data composed of animal images,
wherein the animal detection information includes, as information about a bounding box created to be suitable for an animal object detected from the image, coordinates of a central point of the bounding box, a width of the bounding box, a length of the bounding box and a rotational angle of the bounding box with respect to a reference axis, and includes, as position information indicating keypoints of the animal object, a position of the end of the head of the animal object, a position of the neck and a position of the end of the body, and
wherein the animal detection model is constructed based on learning data in which a plurality of images including at least one animal object is matched with the animal detection information about animal objects included in each image, and
the animal detection model includes a backbone configured to extract a feature from the input image, a neck configured to collect intermediate information from each layer of the backbone based on the feature extracted by the backbone, and a head configured to output the animal detection information based on the intermediate information collected by the neck.

6. The image-based animal object detection method of claim 5,
wherein the process of extracting animal detection information further includes:
extracting information about the class of the animal object detected from the image and information about a pose of the animal object in the image.

7. The image-based animal object detection method of claim 5,
wherein the head of the animal detection model extracts a bounding box of the animal object and a keypoint of the animal object based on cascaded multi-lane deep convolutional networks, and
the cascaded multi-lane deep convolutional networks are constructed to perform a process of extracting coordinates of a major keypoint, a process of extracting a direction of a tangent line passing through the coordinates of the major keypoint and a process of extracting a width and a height of an area including the tangent line and the major keypoint.

8. The image-based animal object detection method of claim 5,
wherein the head of the animal detection model is constructed to extract each of information about the class of the animal object and information about a pose of the animal object based on a single-lane deep convolutional network.

9. A non-transitory computer-readable recording medium that stores therein a computer program configured to perform an image-based animal object detection method of claim 5.

10. A non-transitory computer-readable recording medium that stores therein a computer program configured to perform an image-based animal object detection method of claim 6.

11. A non-transitory computer-readable recording medium that stores therein a computer program configured to perform an image-based animal object detection method of claim 7.

12. A non-transitory computer-readable recording medium that stores therein a computer program configured to perform an image-based animal object detection method of claim 8.

* * * * *